(12) United States Patent
Janson

(10) Patent No.: US 8,544,588 B2
(45) Date of Patent: Oct. 1, 2013

(54) POWER TAKEOFF FOR ALL-WHEEL-DRIVE SYSTEMS

(75) Inventor: David A. Janson, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 275 days.

(21) Appl. No.: 11/937,652

(22) Filed: Nov. 9, 2007

(65) Prior Publication Data
US 2009/0120706 A1 May 14, 2009

(51) Int. Cl.
*B60K 17/16* (2006.01)
*F16H 37/06* (2006.01)

(52) U.S. Cl.
USPC ............................................ 180/248; 475/221

(58) Field of Classification Search
USPC .................................. 180/233, 248, 249, 250
See application file for complete search history.

(56) References Cited

U.S. PATENT DOCUMENTS

| | | | |
|---|---|---|---|
| 4,428,452 A | 1/1984 | Muraoka et al. | |
| 4,476,953 A | 10/1984 | Hiraiwa | |
| 4,700,800 A | 10/1987 | Friedrich et al. | |
| 4,738,152 A | 4/1988 | Takimura et al. | |
| 5,041,068 A | 8/1991 | Kobayashi | |
| 5,054,573 A * | 10/1991 | Bennett | 180/244 |
| 5,083,478 A | 1/1992 | Hiraiwa | |
| 5,083,635 A | 1/1992 | Tashiro | |
| 5,098,351 A | 3/1992 | Kobayashi | |
| 5,234,072 A | 8/1993 | Chludek | |
| 6,076,623 A | 6/2000 | Teraoka et al. | |
| 6,513,615 B2 * | 2/2003 | Bowen et al. | 180/248 |
| 6,523,633 B1 | 2/2003 | Teraoka et al. | |
| 6,620,071 B1 | 9/2003 | Cook et al. | |
| 6,668,961 B2 | 12/2003 | Bowen et al. | |
| 2003/0040394 A1* | 2/2003 | Palazzolo | 475/221 |
| 2003/0141127 A1* | 7/2003 | Kobayashi | 180/233 |
| 2006/0094556 A1* | 5/2006 | Mizon et al. | 475/198 |
| 2006/0100054 A1 | 5/2006 | Maruyama et al. | |
| 2006/0157291 A1* | 7/2006 | Puiu et al. | 180/247 |
| 2007/0093347 A1* | 4/2007 | Janson et al. | 475/199 |

FOREIGN PATENT DOCUMENTS

GB 2119329 A 11/1983

* cited by examiner

*Primary Examiner* — Tony H. Winner
*Assistant Examiner* — Jacob Knutson
(74) *Attorney, Agent, or Firm* — James Dottavio; MacMillan, Sobanski & Todd, LLC

(57) ABSTRACT

A system for transmitting rotary power to the wheels of a motor vehicle includes an input, a planetary final drive connected driveably to the input and including a first output that is driven at a speed that is slower than a speed of the input, and a inter-wheel planetary differential driveably connected to the first output for splitting torque carried by the first output between a second output connected driveably to a first wheel of a first wheel set and a third output connected driveably to a second wheel of the first wheel set.

15 Claims, 5 Drawing Sheets

POWER TAKEOFF FOR ALL-WHEEL-DRIVE SYSTEMS

BACKGROUND OF THE INVENTION

1. Field of the Invention

This invention relates generally to an apparatus for transmitting rotary power in a vehicle powertrain. More particularly it pertains to full-time and part-time all-wheel-drive (AWD) systems driven from a transmission with a planetary final drive.

2. Description of the Prior Art

Power takeoff unit efficiency is a concern in AWD vehicles derived from front wheel drive vehicle platforms, partially due to kinematics dictated by the speed and torque of the transmission output.

The final drive unit of a transmission normally increases torque by a factor of approximately 4.0-4.5 before transmission output torque is delivered to the input of a differential mechanism, which drives the primary wheels of the vehicle, i.e., the front wheels. Then, the amplified torque is stepped down before it is delivered to a power takeoff unit (PTU), which drives the secondary wheels, i.e., the rear wheels.

In a powertrain for a motor vehicle whose transmission includes a planetary final drive unit that amplifies torque, it is possible to split the transmission output torque between the front wheels and rear wheels before performing the planetary torque amplification.

It is also possible in a part-time or torque-on-demand system to deliver the transmission output torque to the power takeoff unit directly, thereby bypassing the torque amplification that normally would occur in the final drive mechanism.

A need exists in the automotive industry for a drive mechanism that splits torque at the high-speed transmission output between the front wheels and rear wheels before a speed reduction of the transmission output occurs.

SUMMARY OF THE INVENTION

A system for transmitting rotary power to the wheels of a motor vehicle includes an input, a planetary final drive connected driveably to the input and including a first output that is driven at a speed that is slower than a speed of the input, and a inter-wheel planetary differential driveably connected to the first output for splitting torque carried by the first output between a second output connected driveably to a first wheel of a first wheel set and a third output connected driveably to a second wheel of the first wheel set.

An inter-axle differential, connected driveably to the input, splits torque carried by the input between an input of the planetary final drive and a second set of wheels.

The system reduces the PTU input torque by about 75 percent and eliminates need to step the speed up again. The PTU is arranged on a single axis.

Efficiency of the PTU is improved more than 50 percent compared to conventional PTU, and its cost and weight are reduced by a similar percentage.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
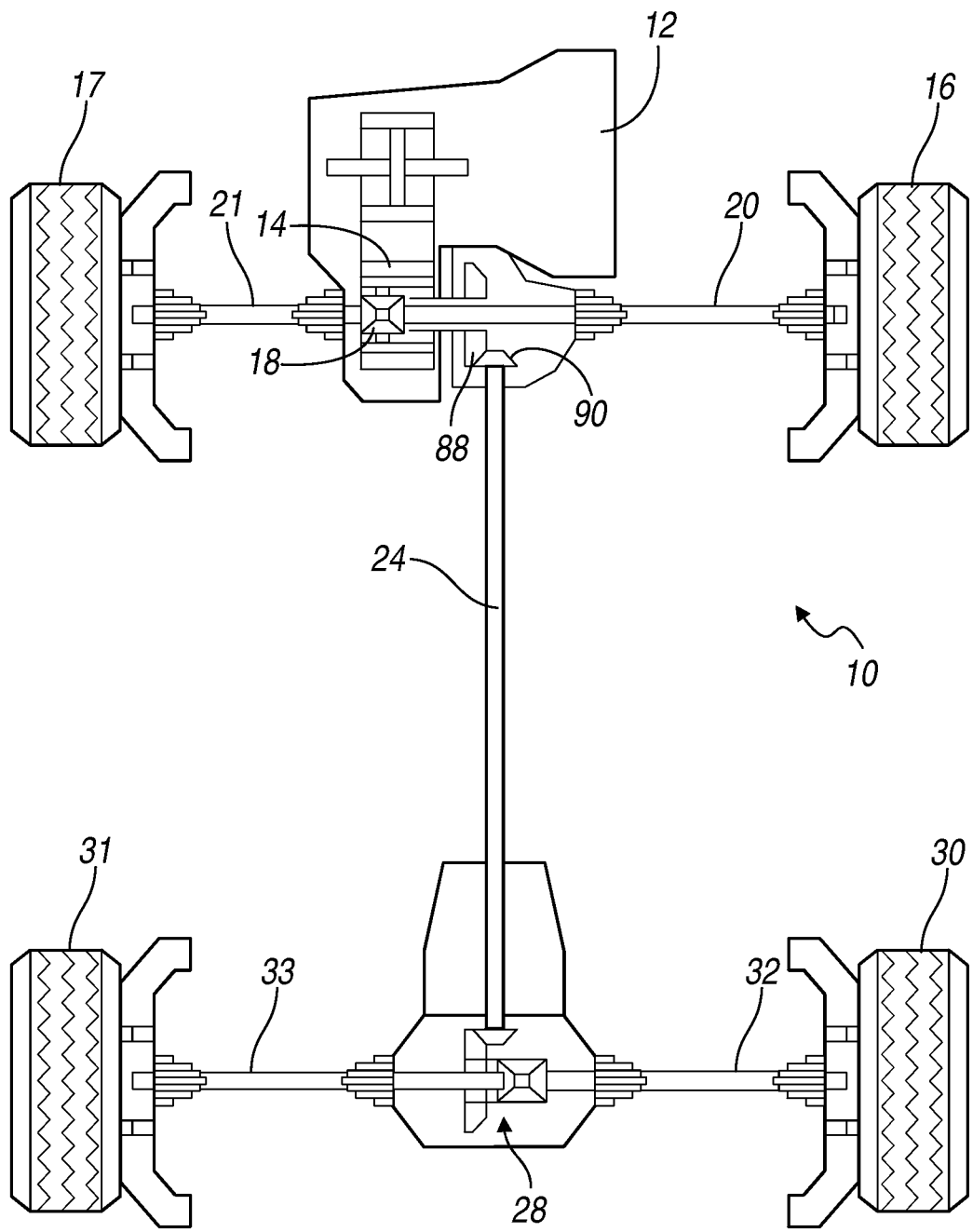
FIG. 1 is a top view of a motor vehicle driveline for transmitting power between a transaxle and the vehicle wheels.

FIG. 1 illustrates a motor vehicle powertrain 10 to which the present invention can be applied. The powertrain shown there is for an all-wheel drive vehicle whose engine and transaxle 12 are transversely mounted in an engine compartment at the front of the vehicle. The transaxle 12 produces multiple forward and reverse ratios of the speed of its output 14, which is continuously driveably connected to front wheels 16, 17, to the speed of its input, which is driveably connected to an engine crankshaft.

An inter-wheel differential mechanism 18, located in the transaxle case, transmits power differentially to a right-side halfshaft 20 and to a left-side halfshaft 21, which are connected to the wheels 16, 17, respectively. Power is transmitted between the transaxle output 14 and driveshaft 24 through a bevel pinion 88 and a mating bevel gear 90 secured to the driveshaft 24. Drive shaft 24 transmits power to a rear inter-wheel differential mechanism 28, from which power is transmitted differentially to the rear wheels 30, 31 through axle shafts or halfshafts 32, 33, respectively.

Figure 2:
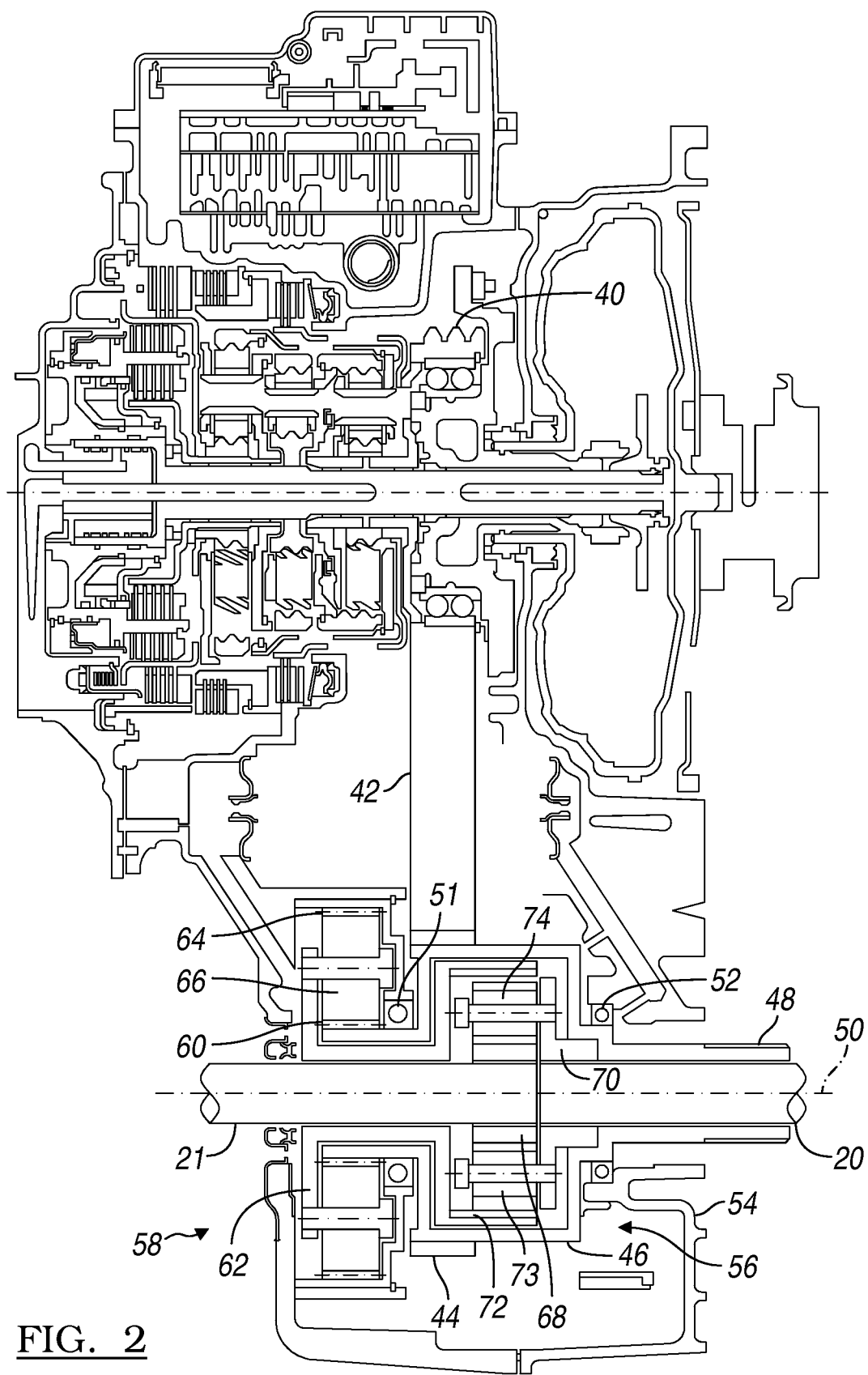
FIG. 2 is a schematic cross section showing a power take-off assembly for a part-time AWD system.

FIG. 2 illustrates a part-time AWD power takeoff system. Power at the output sprocket 40 of a transversely mounted, front wheel drive transaxle is engaged by a drive chain 42, which also engages a sprocket 44 secured to a drum 46. Power is transmitted by drum 46 to a power takeoff shaft 48, which delivers power to the rear wheels 30, 31 through the bevel pinion 88 and bevel gear 90, longitudinally-directed rear drive shaft 24, and the inter-wheel rear differential mechanism 28. A coupler (not shown) is selectively engagable to transmit power to the rear inter-wheel differential 28.

Drum 46 and power takeoff shaft 48 are supported for rotation about a transverse axis 50 by bearings 51, 52, fitted into a housing 54 surrounding a torque splitting differential mechanism 56.

A grounded planetary, final drive 58 includes a sun gear 60, secured to drum 46; a carrier 62; a ring gear 64, held against rotation on housing 54; and a set of planet pinions 66, supported on carrier 62 and meshing with sun gear 60 and ring gear 64.

The power splitting inter-wheel differential 56 is a compound planetary gearset that includes a sun gear 68, a carrier 70, a ring gear 72, and two sets of planet pinions 73, 74 supported on the carrier and meshing with sun gear 68 and ring gear 72. Pinions 73 mesh with pinions 74 and ring gear 72. Pinions 74 mesh with sun gear 68 and pinions 73. The right-hand halfshaft 20 is secured to carrier 70 for rotation as a unit, and the left-hand side halfshaft 21 is secured to sun gear 68 for rotation as a unit.

The grounded planetary final drive gearset 58 causes its output carrier 62 to rotate slower than its sun gear 60 and drum 46. Gearset 56 operates as an inter-wheel differential, splitting power carried by carrier 62 and ring gear 72 between its sun gear 68 and carrier 70, i.e., between the right front and left front wheels 16, 17. Driveshaft 24 transmits power at relatively high speed and low torque to the rear wheels from the transmission output 40.

Figure 3:
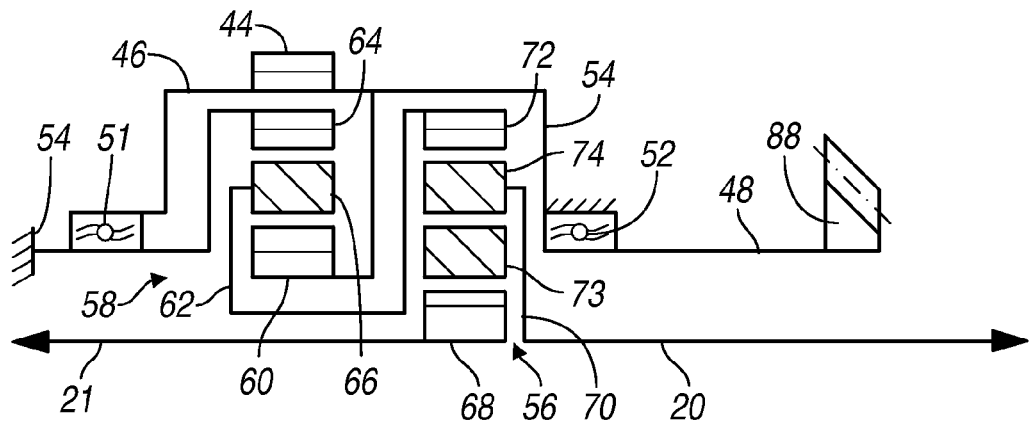
FIG. 3 is a schematic cross section showing a second embodiment of a power take-off assembly for a part-time AWD system.

FIG. 3 illustrates a torque-on-demand, power takeoff system that is substantially identical to that of FIG. 2 except that final drive 58 is located laterally between bearings 51 and 52. A bevel pinion 88 is secured to shaft 48 and meshes with a bevel gear (not shown), secured to the rear drive shaft 24. The bevel pinion 88 and bevel gear 90 direct rotating power from transverse axis 50 to the longitudinal axis of the vehicle.

Figure 4:
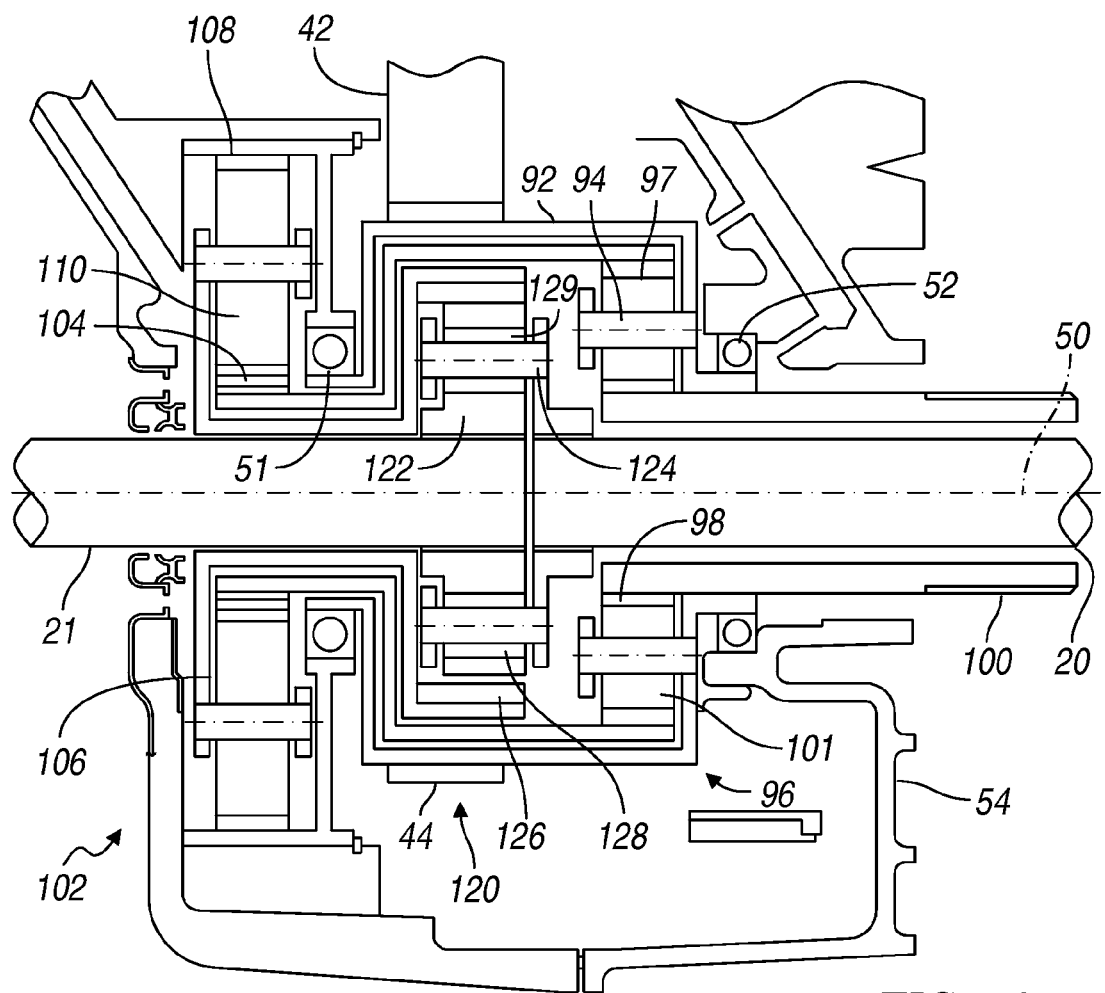
FIG. 4 is a cross section showing a power take-off assembly for a full-time AWD system.

FIG. 4 illustrates a full-time AWD power takeoff system. Power at the output sprocket 40 of a transversely mounted, front wheel drive transaxle is engaged by chain 42, which also engages a sprocket 44 secured to a drum 92. Power is transmitted by drum 92 to the carrier 94 of an inter-axle planetary differential 96, which splits torque delivered to its carrier 94 (preferably 65/35) between a ring gear 97 and a sun gear 98. Ring gear 97 transmits torque to a grounded planetary final drive 102. Sun gear 98 is secured to power takeoff shaft 100. The power splitting inter-axle differential 96 further includes a set of planet pinions 101, supported on carrier 94 and meshing with sun gear 98 and ring gear 97. Power takeoff shaft 100 delivers power to the rear wheels 30, 31 through the bevel gear 90 and bevel pinion 88, longitudinally-directed rear drive shaft, and the inter-wheel differential mechanism 28.

Drum 92 and power takeoff shaft 100 are supported for rotation about transverse axis 50 by bearings 51, 52, fitted into the transaxle housing 54.

A grounded, final drive planetary gearset 102 includes a sun gear 104, secured to ring gear 97; a carrier 106; a ring gear 108, held against rotation on housing 54; and a set of planet pinions 110, supported on carrier 106 and meshing with sun gear 104 and ring gear 108.

A power splitting, inter-wheel, compound planetary differential 120 includes a sun gear 122; a carrier 124; a ring gear 126, which is secured to carrier 106; and two sets of planet pinions 128, 129 supported on carrier 124 and meshing with sun gear 122 and ring gear 126. Pinions 128 mesh with pinions 129 and sun gear 122. Pinions 129 mesh with pinions 128 and ring gear 126. Halfshaft 20 is secured to carrier 124 for rotation as a unit, and halfshaft 21 is secured to sun gear 122 for rotation as a unit. Inter-wheel differential 120 splits its input torque equally between shafts 20, 21.

The grounded planetary gearset 102 causes its carrier 106 to rotate slower than its input sun gear 104. Inter-wheel differential 120 splits power carried to its input ring gear 126 between its carrier 124 and sun gear 122, i.e., between the right front and left front wheels 16, 17. Driveshaft 24 transmits power at relatively high speed and low torque to the rear wheels 30, 31.

Figure 5:
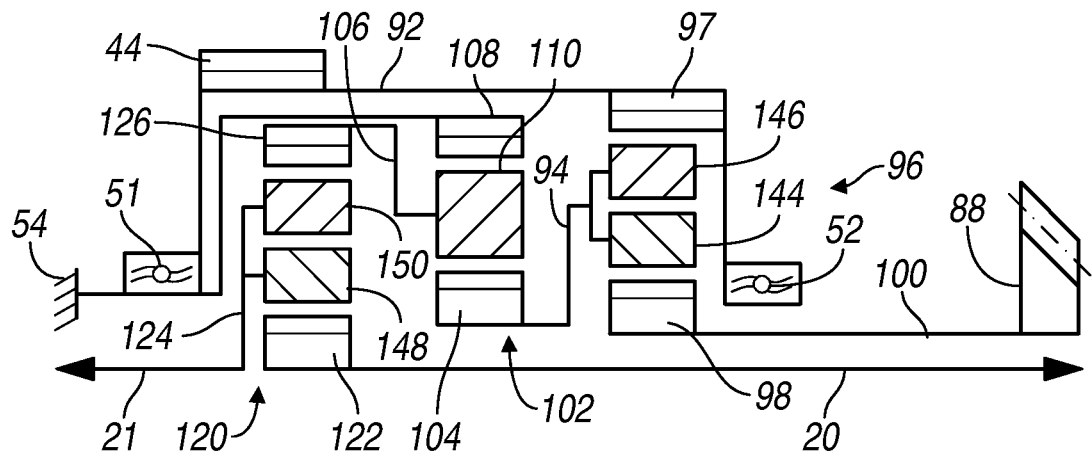
FIG. 5 is a cross section showing a power take-off assembly for a third embodiment of a full-time AWD system having compound inter-wheel and inter-axle differentials.

FIG. 5 illustrates a full-time AWD power takeoff system, in which the planetary final drive 102 is located between a compound inter-axle planetary differential 96 and the compound inter-wheel planetary differential 120. The compound inter-axle planetary differential 96 includes a first set of planet pinions 144, supported on carrier 94 and meshing with sun gear 98; and a second set of planet pinions 146, supported on carrier 94 and meshing with the first set of planet pinions 144 and ring gear 97. Sun gear 98 is secured to output shaft 100. The compound inter-axle planetary differential 96 produces a 35/65 torque split of its input torque on drum 92 between output shaft 100 and carrier 94, respectively.

The inter-wheel, planetary differential 120 includes a first set of planet pinions 148, supported on carrier 124 and meshing with sun gear 122; and a second set of planet pinions 150, supported on carrier 124 and meshing with the first set of planet pinions 148 and ring gear 126. Carrier 124 is secured to halfshaft 21. Sun gear 122 is secured to halfshaft 20.

Figure 6:
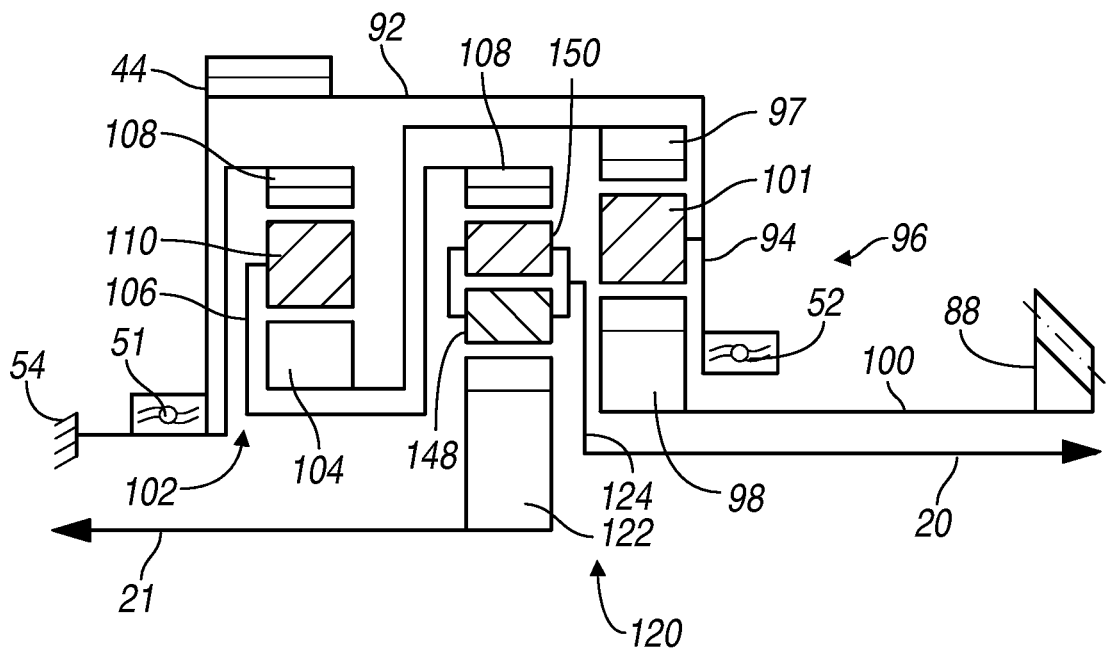
FIG. 6 is a cross section showing a power take-off assembly for a fourth embodiment of a full-time AWD system having a compound inter-wheel differential.

FIG. 6 illustrates a full-time AWD power takeoff system, in which the inter-axle planetary differential 96 is located to the right of the compound inter-wheel planetary differential 120 and the planetary final drive 102. The compound inter-wheel planetary differential 120 includes a first set of planet pinions 148, supported on carrier 124 and meshing with sun gear 122; and a second set of planet pinions 150, supported on carrier 124 and meshing with the first set of planet pinions 148 and ring gear 108. Sun gear 122 of the inter-wheel, planetary differential 120 is secured to halfshaft 21. The carrier 124 is secured to halfshaft 20.

Figure 7:
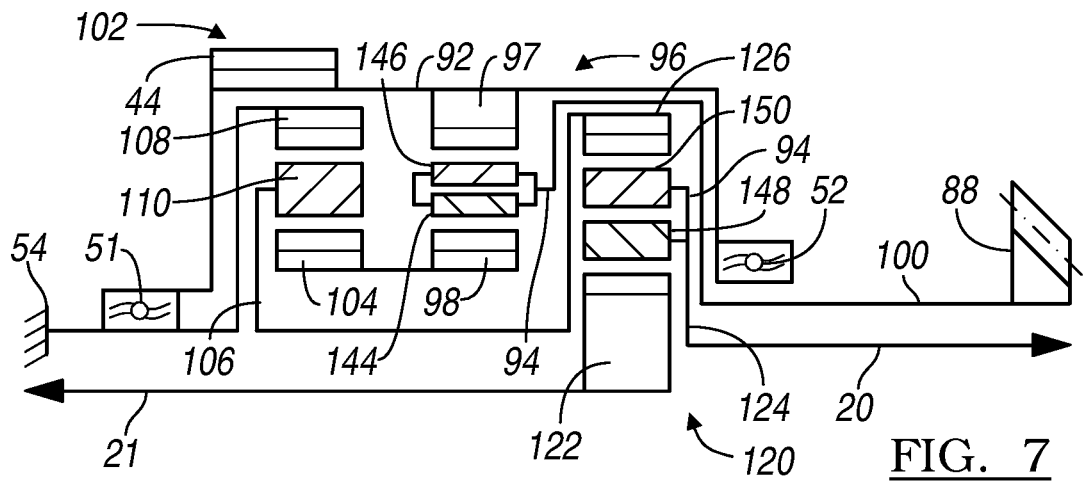
FIG. 7 is a cross section showing a power take-off assembly for a fifth embodiment of a full-time AWD system having compound inter-wheel and inter-axle differentials.

FIG. 7 illustrates a full-time AWD power takeoff system, in which the inter-wheel planetary differential 120 is located to the right of the inter-axle planetary differential 96 and the planetary final drive 102. The compound inter-axle planetary differential 96 includes a first set of planet pinions 144, supported on carrier 94 and meshing with sun gear 98; and a second set of planet pinions 146, supported on carrier 94 and meshing with the first set of planet pinions 144 and ring gear 97. The inter-wheel, planetary differential 120 includes a first set of planet pinions 148, supported on carrier 124 and meshing with sun gear 122; and a second set of planet pinions 150, supported on carrier 124 and meshing with the first set of planet pinions 148 and ring gear 126. Sun gear 122 of the inter-wheel, planetary differential 120 is secured to halfshaft 21. Carrier 124 is secured to halfshaft 20. The final drive 102 is located inside the drum 92 and between bearings 51, 52.

Figure 8:
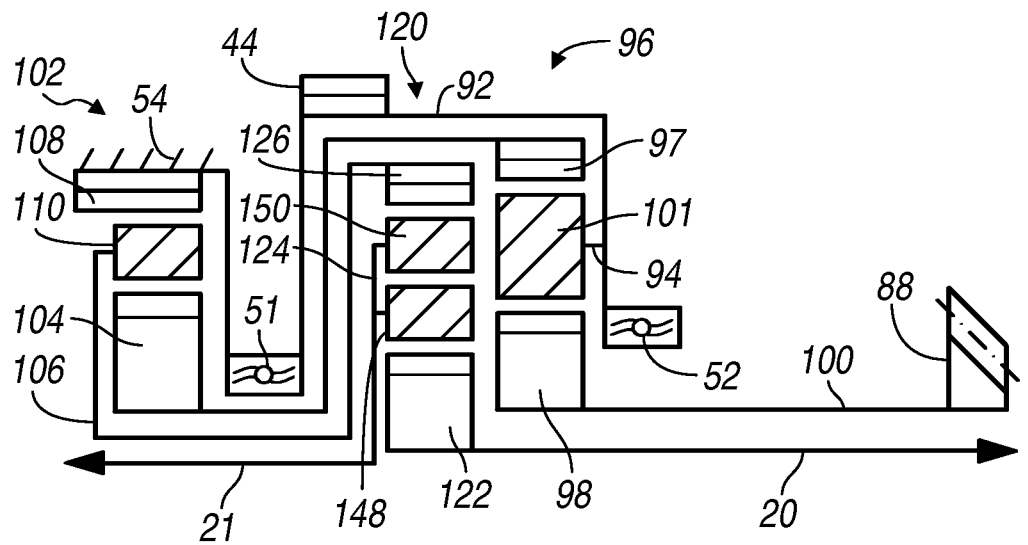
FIG. 8 is a cross section showing a power take-off assembly for a sixth embodiment of a full-time AWD system having a compound inter-wheel differential.

FIG. 8 illustrates a full-time AWD power takeoff system, in which an inter-wheel differential 120 is a compound planetary, located between the inter-axle planetary differential 96 and the planetary final drive 102. The inter-wheel, planetary differential 120 includes a first set of planet pinions 148, supported on carrier 124 and meshing with sun gear 122; and a second set of planet pinions 150, supported on carrier 124 and meshing with the first set of planet pinions 148 and ring gear 126. Sun gear 122 of the inter-wheel, planetary differential 120 is secured to halfshaft 20. Carrier 124 is secured to halfshaft 21. The arrangement of FIG. 8 is substantially identical to that of FIG. 6 except ring gear 108 is secured directly to housing 54, and bearing 51 is located to the right of the planetary final drive 102.

Figure 9:
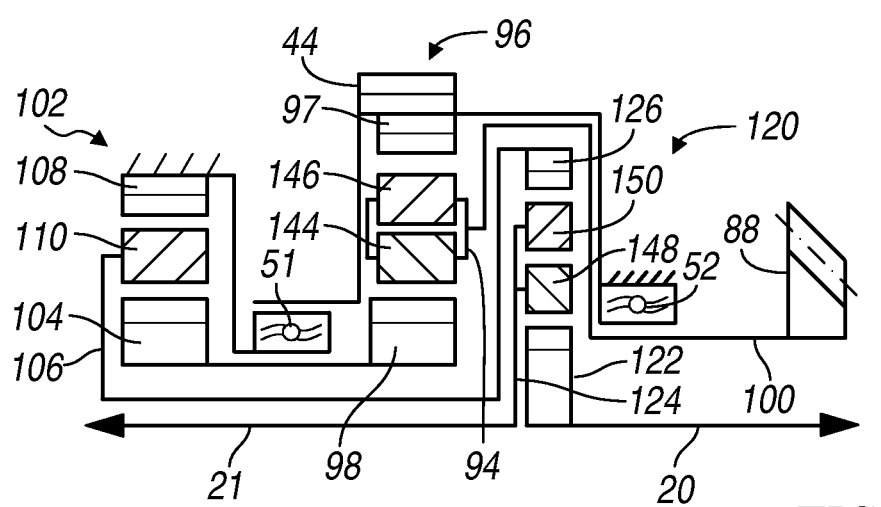
FIG. 9 is a cross section showing a power take-off assembly for a seventh embodiment of a full-time AWD system having compound inter-wheel and inter-axle differentials.

FIG. 9 illustrates a full-time AWD power takeoff system, in which the inter-wheel planetary differential 120 is a compound planetary located to the right of the inter-axle planetary differential 96, which is a compound planetary, and the planetary final drive 102. The transmission output sprocket 44 is secured directly to ring gear 97, which is supported on bearings 51, 52. The compound inter-axle planetary differential 96 includes a first set of planet pinions 144, supported on carrier 94 and meshing with sun gear 98; and a second set of planet pinions 146, supported on carrier 94 and meshing with the first set of planet pinions 144 and ring gear 97. The inter-wheel, planetary differential 120 includes a first set of planet pinions 148, supported on carrier 124 and meshing with sun gear 122; and a second set of planet pinions 150, supported on carrier 124 and meshing with the first set of planet pinions 148 and ring gear 126. Sun gear 122 of the inter-wheel, planetary differential 120 is secured to halfshaft 20. Carrier 124 is secured to halfshaft 21.

In accordance with the provisions of the patent statutes, the preferred embodiment has been described. However, it should be noted that the alternate embodiments can be practiced otherwise than as specifically illustrated and described.

What is claimed is:

1. A system for driving vehicle wheels, comprising:
an input mounted on and secured to a drum;
a final drive secured to the drum, including an output;
a differential transmitting torque between the output and first wheels;
a takeoff shaft connected to the drum;
a bevel pinion secured to the takeoff shaft, transmitting torque to second wheels, the drum encircling the differential and the final drive.

2. The system of claim 1 wherein:
the final drive includes a sun gear connected driveably to the input, a ring gear held against rotation, a final drive output carrier, and planet pinions supported on the final drive output carrier and meshing with the ring gear and the sun gear; and
the planetary differential includes a first sun gear connected driveably to one of the first wheels, a first ring gear connected driveably to the final drive output carrier, a first carrier connected driveably to a second of the first wheels, first planet pinions supported on the first carrier and meshing with the first ring gear, and second planet pinions supported on the first carrier and meshing with the first planet pinions and the first sun gear.

3. The system of claim 1 further comprising:
a first bearing located at a first lateral side of the final drive;
a second bearing located at a second lateral side of the planetary differential opposite the first lateral side and spaced from the final drive; and
a drum secured to the input and to the takeoff shaft, supported for rotation on the bearings.

4. The system of claim 1, wherein further comprising:
the planetary differential is located at a first lateral side of the final drive and axially between the final drive and the bevel pinion.

5. A system for driving vehicle wheels, comprising:
a planetary differential splitting input torque between a first output and the first wheels;
a final drive connected to the first output driving a second output slower than the first output;
a second planetary differential located between the final drive and the planetary differential, transmitting torque at the second output to the second wheels.

6. The system of claim 5 wherein:
the final drive includes a sun gear, a ring gear held against rotation, a final drive output carrier, and planet pinions supported on the final drive output carrier and meshing with the ring gear and the sun gear;
the second planetary differential includes a first sun gear connected driveably to one of the second wheels, a first ring gear connected driveably to the second output, a first carrier connected driveably to another of the second wheels, first planet pinions supported on the first carrier and meshing with the first ring gear, and second planet pinions supported on the first carrier and meshing with the first planet pinions and the first sun gear; and
the planetary differential includes a second sun gear connected driveably to the first wheel set, a second ring gear connected driveably to the first output, a second carrier connected driveably to the input, and the second planet pinions supported on the second carrier and meshing with the second ring gear and the second sun gear.

7. The system of claim 5 wherein the:
the second planetary differential includes a first sun gear connected driveably to a first wheel of the second wheel set, a first ring gear connected driveably to the second output, a first carrier connected driveably to a second wheel of the second wheel set, first planet pinions supported on the first carrier and meshing with the first ring gear, and second planet pinions supported on the first carrier and meshing with the first planet pinions and the first sun gear; and
the planetary differential includes a second sun gear connected driveably to the first wheel set, a second ring gear connected driveably to the first output, a second carrier connected driveably to the input, and second planet pinions supported on the second carrier and meshing with the second ring gear and the second sun gear.

8. The system of claim 5 further comprising:
a first bearing located between the final drive and the second planetary differential;
a second bearing located at a lateral side of the planetary differential; and
the drum secured to the input, driveably connected to a ring gear of the planetary differential, and supported for rotation on the bearings.

9. The system of claim 5 further comprising:
a first bearing located at a first lateral side of the final drive;
a second bearing located at a second lateral side of the planetary differential opposite the first lateral side; and
the drum secured to the input driveably connected to a ring gear of the planetary differential, and supported for rotation on the bearings.

10. A system for driving vehicle wheels, comprising:
an input;
a planetary differential, for splitting input torque between a first output and a first wheel set;
a final drive connected to the first output for driving a second output slower than the first output; and
a second planetary differential for transmitting torque at the second output to wheels of a second wheel set, the final drive located between the planetary differential and the second planetary differential;
a first bearing located at a first lateral side of the planetary differential;
a second bearing located at a second lateral side of the second planetary differential opposite the first lateral side; and
a drum secured to the input and to a ring gear of the second planetary differential, encircling the differentials and the final drive, and supported for rotation on the bearings.

11. A system for driving vehicle wheels, comprising:
an input mounted on and secured to a drum;
a planetary differential, for splitting input torque between a first output and a first wheel set;
a final drive connected to the first output for driving a second output slower than the first output;

a second planetary differential for transmitting torque at the second output to wheels of a second wheel set, the drum encircling the differentials.

12. The system of claim 11 wherein:

the final drive includes a sun gear, a ring gear held against rotation, a final drive output carrier, and planet pinions supported on the final drive output carrier and meshing with the ring gear and the sun gear;

the second planetary differential includes a first sun gear connected driveably to a first wheel of the second wheel set, a first ring gear connected driveably to the second output, a first carrier connected driveably to a second wheel of the second wheel set, first planet pinions supported on the first carrier and meshing with the first ring gear, and second planet pinions supported on the first carrier and meshing with the first planet pinions and the first sun gear; and the planetary differential includes a second sun gear connected driveably to the first wheel set, a second ring gear connected driveably to the sun gear, a second carrier connected driveably to the input, and second planet pinions supported on the second carrier and meshing with the second ring gear and the second sun gear.

13. The system of claim 11 wherein:

the second planetary differential includes a first sun gear connected driveably to a first wheel of the second wheel set, a first ring gear connected driveably to the second output, a first carrier connected driveably to a second wheel of the second wheel set, first planet pinions supported on the first carrier and meshing with the first ring gear, and second planet pinions supported on the first carrier and meshing with the first planet pinions and the first sun gear; and the planetary differential includes a second sun gear connected driveably to the first wheel set, a second ring gear connected driveably to the first output, a second carrier connected driveably to the input, and second planet pinions supported on the second carrier and meshing with the second ring gear and the second sun gear.

14. The system of claim 11 further comprising:

a first bearing located at a first lateral side of the final drive;

a second bearing located at a second lateral side of the second planetary differential opposite the first lateral side; and the drum is secured to the input, driveably connected to a ring gear of the planetary differential, and supported for rotation on the bearings.

15. The system of claim 11 further comprising:

a first bearing located at a lateral side of the second planetary differential;

a second bearing located between the final drive and the planetary differential; and the drum, driveably connected to a ring gear of the planetary differential, secured to the input and supported for rotation on the bearings.

* * * * *